3,214,397
METHOD FOR PRODUCING STABILIZED POLY-URETHANE FOAM COMPOSITIONS
Eugene F. Cox, Charleston, W. Va., assignor to Union Carbide Corporation, a corporation of New York
No Drawing. Filed July 20, 1964, Ser. No. 383,988
7 Claims. (Cl. 260—2.5)

This application is a continuation-in-part of copending application Serial No. 79,571, filed December 30, 1960, now abandoned.

This invention relates to polyurethane compositions, and more particularly to cellular foamed polyurethanes to which improved stability has been imparted by the incorporation therein of phenothiazine.

Synthetic polyurethane compositions derived from reactions involving polyisocyanates with active hydrogen-containing compounds are rapidly becoming competitive with natural and synthetic rubbers. Urethane polymers formed by reactions of organic polyisocyanates with active hydrogen-containing compounds, and particularly with polyethers, are readily foamed by internal development of carbon dioxide or by a blowing agent to provide cellular urethane compositions of widely varying and pre-selected properties. One problem that is encountered when polyethers are employed to produce polyurethane foams is a tendency of the foam to scorch or discolor during the foaming operation. Scorch is caused by free radical reactions that involve the ether moieties of the polyether. Various compositions that are normally present in the polyurethane formulation can catalyze the free radical reactions that cause the scorching. Among such compositions are tertiary amines (which can be present in the formulation as catalysts for the reaction of isocyanate with water or with polyol, or as amine-started polyols, or both) and various metallic compounds that can be present as impurities. The impurities that are encountered most frequently are compounds that contain iron which are picked up from reaction equipment. Other metallic compounds that can catalyze the scorch reactions include those containing copper, nickel, and cobalt. It has also been found that halocarbon blowing agents can help to propagate the free radical reactions, although such blowing agents are not normally catalysts for such reactions.

The invention is based upon the discovery that phenothiazine is effective as a stabilizer for reducing, and in many cases completely preventing, scorch in polyether-based polyurethane foams that contain one or more compositions such as tertiary amines that can catalyze the scorching reactions. The phenothiazine prevents propagation of the free radical reactions that cause scorch, and thereby substantially eliminates this problem.

Phenothiazine is employed in a small amount sufficient to stabilize against scorch. For example, effective stabilization can be obtained with from 0.001 weight percent to 5.0 weight percent, based on weight of polyurethane reaction mixture, of phenothiazine. The preferred amount of phenothiazine is from about 0.05 to 3.0 weight percent, based on the weight of the polyurethane reaction mixture.

In carrying out the invention the phenothiazine stabilizer can be incorporated in the fluid polyurethane reaction mixture by addition to one of the reactants or to a polyether-isocyanate prepolymer. The stabilizer is normally soluble in the urethane reaction mixture and is easily blended mechanically or by hand. The mixture is then foamed, preferably in the presence of a catalyst, by means of a blowing agent such as a halocarbon or water or both. The network formation and building up of the foam can take place substantially simultaneously, as in the one-shot method, or in more or less separate steps as in the prepolymer and semiprepolymer techniques.

The polyurethane foams stabilized according to the invention are preferably derived from polyether-isocyanate reaction systems in which varying amounts of a tertiary amine have been added thereto prior to foam development with a blowing agent. When admixed with the urethane reaction system, the tertiary amines have the known advantage of effecting improved catalysis by accelerating the reaction rate between isocyanates and active hydrogen atoms of the polyether compound. Depending upon the type of tertiary amine, this modification can also diversify the combinations of characteristics obtainable in the ultimate foam product by increasing the number of cross-linking sites which results in a rapid build-up of viscosity simultaneously with foam development, and by improving desired characteristics of dimensional stability under humid aging conditions. The amount of tertiary amine employed generally will vary within the range of from about 0.001 percent to 35.0 percent by weight based on the polyether-isocyanate reaction mixture, depending upon the molecular weight of the polyether reactant and whether the particular tertiary amine contains active hydrogen atoms reactive with isocyanate groups. For tertiary amines which are substantially unreactive with isocyanate groups, for example, triethylamine, tributylamine and the like, the amount employed usually ranges from about 0.01 to 6.0 percent by weight, based upon the polyether-polyisocyanate reaction mixture. When tertiary amines reactive with isocyanate are used, typical examples of which are the alkylene oxide addition products of ammonia or a primary or secondary amine, larger amounts of the tertiary amine ranging from 5.0 to 35 percent by weight, preferably about 10 to 30 percent, are employed to provide improvement in dimensional stability.

Typical tertiary amines which are substantially unreactive with isocyanate groups include triethylamine, tributylamine, trioctylamine, N-methylmorpholine, N-ethylmorpholine, N-octadecylmorpholine (N-cocomorpholine), N - methyldiethanolamine, N,N - dimethylethanolamine, N,N'-bis(2-hydroxypropyl) - piperazine, N,N,N'N'-tetramethylethylenediamine, N,N,N',N'-tetramethyl - 1,3 - propanediamine, triethylenediamine (1,4-diazabicyclo[2,2,2]octane), bis[2-(N,N-dimethylamino)ethyl]ether, 1,4-bis-(2-hydroxypropyl) - 2 - methylpiperazine, N,N-dimethylbenzylamine, N,N-dimethylcyclohexylamine, bis(N,N-diethylaminoethyl) adipate, N,N-diethylbenzylamine, N-ethylhexamethyleneamine, N-ethylpiperidine, alpha - methylbenzyldimethylamine, dimethylhexadecylamine, 3-methylisoquinoline, dimethylcetylamine, and the like.

Typical tertiary amines containing active hydrogen atoms reactive with isocyanate groups include triethanolamine, triisopropanolamine, N - methyldiethanolamine, N-ethyldiethanolamine, polyoxyalkylene polyol polymers and copolymers of alkylene oxides, such as propylene oxide, ethylene oxide, homopolymers, copolymers and mixtures thereof started with triethanolamine, triisopropanolamine, ethylenediamine, ethanolamine, diethylenetriamine and the like.

The active hydrogen-containing polyethers which are used in preparing the polyurethane foams include the linear and branched chain polyethers which have a plurality of acyclic ether oxygens and contain at least two hydroxyl groups. The polyethers are substantially free from functional groups other than hydroxyl groups and normally have molecular weights, based on their hydroxyl value, ranging from about 250 to about 5000.

Illustrative polyethers include the polyoxyalkylene polyols containing one or more chains of connected oxyalkylene groups which are prepared by the reaction of one or more alkylene oxides with acyclic and alicyclic polyols. Examples of the polyoxyalkylene polyols include the polyoxyethylene glycols prepared by the addition of ethylene oxide to water, ethylene glycol or dipropylene glycol; polyoxypropylene glycols prepared by the addition of propylene oxide to water, propylene glycol or dipropylene glycol; mixed oxyethylene-oxypropylene polyglycols prepared in a similar manner utilizing a mixture of ethylene oxide and propylene oxide or a sequential addition of ethylene oxide and propylene oxide; and the polyoxybutylene glycols and copolymers such as polyoxyethyleneoxybutylene glycols and polyoxypropyleneoxybutylene glycols. Included in the term "polyoxybutylene glycols" are polymers of 1,2-butylene oxide, 2,3-butylene oxide and 1,4-butylene oxide.

Other acylic and alicyclic polyols which can be reacted with ethylene oxide, propylene oxide, butylene oxide or mixtures thereof to provide useful polyethers include glycerol, 1,1,1-trimethylolpropane, 1,2,6-hexanetriol, pentaerythritol, sorbitol, glycosides, such as methyl, ethyl, propyl, butyl and 2-ethylhexyl arabinoside, xyloside, fructoside, glycoside, rhammoside, etc. and polyethers prepared by the reaction of alkylene oxides with sucrose, for example:

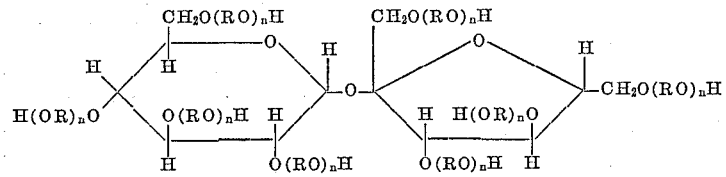

wherein R is ethylene, propylene, butylene, or mixtures thereof, and $n$ is an integer such that the average molecular weight of the polyether is 250 and higher.

Further included are polyethers prepared by reacting a 1,2-alkylene oxide such as ethylene oxide, propylene oxide, butylene oxide or mixtures thereof with mononuclear polyhydroxybenzenes such as resorcinal, pyrogallol, phloroglucinol, hydro quinone, 4,6-di-t-butylcatechol, catechol, orcinol, methylphoroglucinol, 2,5,6-trimethylresorcinol, 4 - ethyl-5,6 - dimethylresorcinol, n - hexylresorcinol, 4 - chloro - 5 - methylresorcinal, and the like; polyethers prepared by reacting 1,2 - alkylene oxides or mixtures thereof with fused ring systems such as 3 - hydroxy - 2 - naphthol, 6,7 - dihydroxy - 1 - naphthol, 2-hydroxy-1-naphthol, 2,5 - dihydroxy-1-naphthol, 9,10 - dihydroxyanthracene, 2,3 - dihydroxyphenanthrene, etc.

Other polyethers which can be employed are those obtained by reacting hydroxybenzenes such as the various di-, tri- and tetraphenylol compounds in which two to four hydroxybenzene groups are attached by means of single bonds or by an aliphatic hydrocarbon radical containing one to twelve carbon atoms. The term "polynuclear" as distinguished from "mononuclear" is used to designate at least two benzene nuclei in a compound.

Exemplary diphenylol compounds include 2,2-bis(p-hydroxyphenyl)propane; bis(p-hydroxyphenyl)methane and the various diphenols and diphenylol methanes disclosed in U.S. Patents 2,506,486 and 2,744,882, respectively.

Exemplary triphenylol compounds which can be employed include the alpha,alpha,omega-tris(hydroxyphenyl) alkanes such as 1,1,2-tris(hydroxyphenyl)ethanes;
1,1,3-tris(hydroxyphenyl)propanes;
1,1,3-tris(hydroxy-3-methylphenyl)propanes;
1,1,3-tris(dihydroxy-3-methylphenyl)propanes;
1,1,3-tris(hydroxy-2,4-dimethylphenyl)propane;
1,1,3-tris(hydroxy-2,5-dimethylphenyl)propanes;
1,1,3-tris(hydroxy-2,6-dimethylphenyl)propane;
1,1,4-tris(hydroxyphenyl)butanes;
1,1,4-tris(hydroxyphenyl)-2-ethylbutanes;
1,1,4-tris(dihydroxyphenyl)butanes;
1,1,5-tris-(hydroxyphenyl)-3-methylpentanes;
1,1,8-tris(hydroxyphenyl)octanes;
1,1,10-tris(hydroxyphenyl)decanes;

and the like.

Tetraphenylol compounds which can be reacted with 1,2-alkylene oxides include the alpha,alpha,omega,omega-tetrakis(hydroxyphenyl)alkanes such as 1,1,2,2-tetrakis(hydroxyphenyl)ethanes;
1,1,3,3-tetrakis(hydroxy-3-methylphenyl)propanes;
1,1,3,3-tetrakis(dihydroxy-3-methylphenyl)propanes;
1,1,4,4-tetrakis(hydroxyphenyl)butanes;
1,1,4,4-tetrakis(hydroxyphenyl)-2-ethylbutanes;
1,1,5,5-tetrakis(hydroxyphenyl)pentanes;
1,1,5,5-tetrakis(hydroxyphenyl)-3-methylpentanes;
1,1,5,5-tetrakis(dihydroxyphenyl)pentanes;
1,1,8,8-tetrakis(hydroxy-3-butylphenyl)octanes;
1,1,8,8-tetrakis(dihydroxy-3-butylphenyl)octanes;
1,1,8,8-tetrakis(hydroxy-2,5-dimethylphenyl)octanes;
1,1,10,10-tetrakis(hydroxyphenyl)decanes;

and the corresponding compounds which contain substituent groups in the hydrocarbon chain such as 1,1,6,6-tetrakis(hydroxyphenyl)-2-hydroxyhexanes;
1,1,6,6 - tetrakis(hydroxyphenyl)-2-hydroxy-5-methylhexanes;
1,1,7,7-tetrakis(hydroxyphenyl)-3-hydroxyheptanes;

and the like.

Other particularly useful polyethers which can be employed are the ethylene oxide, propylene oxide, and butylene oxide adducts of phenolic and resole type resinous materials.

Novolaks are mixtures of polynuclear compounds of the diphenylmethane type of structure, such as 4,4'-dihydroxydiphenylmethane and 2,4'-dihydroxydiphenylmethane formed by the Baeyer reaction of phenol and formaldehyde. In a typical synthesis, novolaks are prepared by condensing one mole of phenolic compound, such as phenol or cresol, with 0.8 mole of an aldehyde, such as formaldehyde or furfural, under acid conditions at a temperature around 160° C. to 170° C. The polynuclear products frequently contain 4 to 8 units and may contain 12 or more units. Novolaks, as such, are non-curable, thermoplastic resins.

In addition to the above described polyethers it is also within the scope of the invention to blend varying amounts of polyfunctional compounds with the polyethers before reaction with isocyanate. Such compounds include, among others, saturated aliphatic polyols such as glycerol, 1,2,4-butanetriol, 1,2,6-hexanetriol, trimethylolpropane, pentaerythritol, and the like.

The average molecular weight of the polyether or polyethers used should range from about 250 to about 5000 depending upon the characteristics desired in the foamed urethane product. As a general guide, cellular urethane foams of maximum rigidity are prepared by the use of polyethers having a molecular weight range of about 250 to 1500; for semirigid foams the molecular weight of the polyether should be about 800 to 1800; and for flexible open-cell foams the polyether should be of increased chain length and have a molecular weight of about 1800 to 5000.

A variety of isocyanates may be employed for reaction with the polyethers above described to provide urethane foams which can be stabilized according to the invention. Preferred isocyanates are polyisocyanates and polyisothiocyanates of the general formula:

$$R(NCG)_x$$

wherein G is oxygen or sulfur, x is an integer of two or more and R is an alkylene, substituted alkylene, arylene or substituted arylene radical, a hydrocarbon, or substituted hydrocarbon containing one or more aryl —NCG bonds and one or more alkyl —NCG bond. R can also include radicals such as —RZR— where Z may be a divalent moiety such as —O—, —O—R—O—, —CO—, —CO₂—, —S—, —S—R—S—, —SO₂—, etc. Examples of such compounds include hexamethylene diisocyanate, 1,8-diisocyanato-p-menthane, xylylene diisocyanates (OCNCH₂CH₂CH₂OCH₂)₂, 1-methyl-2,4-diisocyanatocyclohexane, phenylene diisocyanates, tolylene diisocyanates, chlorophenylene diisocyanates, diphenylmethane-4,4'-diisocyanate, naphthalene-1,5-diisocyanate, triphenylmethane-4,4',4''-triisocyanate, xylene-α,α'-diisothiocyanate, and isopropylbenzene-α,4-diisocyanate.

Further included are dimers and trimers of isocyanates and diisocyanates and polymeric diisocyanates of the general formulae:

$$(RNCG)_x$$

and $$[R(NCG)_x]_y$$

in which x and y are two or more, as well as compounds of the general formula:

$$M(NCG)_x$$

in which x is two or more and M is a monofunctional or polyfunctional atom or group. Examples of this type include ethylphosphonic diisocyanate, $$C_2H_5P(O)(NCO)_2$$

phenylphosphonic diisocyanate, $C_6H_5P(NCO)_2$; compounds containing a ≡Si—NCG group, isocyanates derived from sulfonamides $R(SO_2NCO)_4$, and the like. The aromatic polyisocyanates are preferred, particularly the arylene diisocyanates such as 2,4- and 2,6-tolylene diisocyanate.

The preparation of polyether-based urethane foams can be carried out by the one-shot, semiprepolymer or prepolymer techniques, all of which are well known.

The amount of isocyanate employed will depend upon the density of the urethane foam and the amount of cross linking desired. In general the total —NCO equivalent to total active hydrogen equivalent should be such as to provide a ratio of 0.8 to 1.2 equivalents of —NCO per equivalent of active hydrogen, and preferably a ratio of about 1.0 to 1.1 equivalents of —NCO per equivalent of active hydrogen.

The foaming is effected by the use of water, or by the use of liquefied halocarbon gases which have boiling points below about 80° F. and above —60° F., or by a combination of the two methods. The liquefied gases are saturated, aliphatic, at least partially halogenated hydrocarbons which vaporize at or below the temperature of the foaming mass.

Preferred blowing agents are water and the halocarbons such as trichloromonofluoromethane; dichlorodifluoromethane, dichlorofluoromethane, 1,1-dichloro-1-fluoroethane; 1-chloro-1,1-difluoro, 2,2-dichloroethane; and 1,1,1-trifluoro, 2-chloro-2-fluoro, 3,3-difluoro,4,4,4-trifluorobutane, dichloromethane, and the like. The amount of blowing agent used will vary with density desired in the foamed product. In general it may be stated that for 100 grams of resin mix containing an average NCO/OH ratio of 1 to 1, about 0.005 to 0.3 mole of gas is used to provide densities ranging from 30 to 1 lbs. per cubic foot.

Catalysts that are suitable for accelerating the polyether-isocyanate reaction include a wide variety of organic tin catalysts as well as the tertiary amines mentioned above.

Among the organic tin compounds that deserve particular mention are stannous acylates such as stannous acetate, stannous octoate, stannous laurate, stannous oleate, etc.; stannous alkoxides such as stannous butoxide, stannous 2-ethylhexoxide, stannous phenoxide, o, m and p-stannous cresoxides, etc.; dialkyl tin salts of carboxylic acids, e.g., dibutyltin diacetate, dibutyltin dilaurate, dibutyltin maleate, dilauryltin diacetate, dioctyltin diacetate, and the like. Similarly there may be used a trialkyltin hydroxide, dialkyltin oxide or dialkyltin chloride. Examples of these compounds include trimethyltin hydroxide, tributyltin hydroxide, trioctyltin hydroxide, dibutyltin oxide, dioctyltin oxide, dilauryltin oxide, dibutyltin dichloride, dicotyltin dichloride, and the like. The catalysts are used in catalytic amounts, for example, from 0.01 to 1.0 weight percent, based on weight of the polyether polyol.

It is also within the scope of the invention to employ small amounts, e.g., about 0.001 to 5 percent, by weight, based on the total ingredients, of an emulsifying agent such as a siloxane-oxyalkylene copolymer having from about 10 to 80 percent by weight of siloxane polymer and from 90 to 20 percent by weight of alkylene oxide polymer, such as the copolymers described in U.S. Patent 2,834,748. Although the use of an emulsifier is desirable to influence the type of foam structure that is formed, the foam products of the invention can be prepared without emulsifiers in some cases.

The following examples illustrate the best mode now contemplated for carrying out the invention.

*Example 1*

75 parts of a mixture comprising 65% by weight of a propylene oxide addition product of 1,1,3-tris(hydroxyphenyl)propane (Hydroxyl No. 250) and 35% by weight of a propylene oxide addition product of glycerol (Hydroxyl No. 633) were blended with 130.5 parts of a semiprepolymer prepared by reacting the above-described polyether polyol with 61 percent excess of an 80/20 mixture of 2,4- and 2,6-tolylene diisocyanate, 0.2 part dibutyltin dilaurate, 0.4 part of a silicone oil surfactant (siloxane-oxyalkylene copolymer), 34 parts trichloromonofluoromethane and 25 parts of a propylene oxide addition product of diethylenetriamine (Hydroxyl No. 700). The foamed product was cured for 10 minutes at 70° C.

*Example 2*

75 parts of a propylene oxide addition product of alpha-methyl glucoside (Hydroxyl No. 444) were blended with 138 parts of a semiprepolymer prepared from said propylene oxide adduct of alpha-methyl glucoside and 62.5 percent excess tolylene diisocyanate, 25 parts of a propylene oxide addition product of diethylenetriamine (Hydroxyl No. 700), 0.4 part of a silicone oil surfactant (siloxaneoxyalkylene copolymer), 0.2 part dibutyltin dilaurate and 36 parts trichloromonofluoromethane. The foamed product was cured for 10 minutes at 70° C.

*Example 3*

77 parts of a mixture comprising 65% by weight of a propylene oxide addition product of 1,1,3-tris(hydroxyphenyl)-propane (Hydroxyl No. 250) and 35% by weight of a propylene oxide addition product of glycerol (Hydroxyl No. 633) were blended with 140 parts of a semiprepolymer prepared from the above-described polyether polyol and a 62.5 excess of tolylene diisocyanate, 23 parts triisopropanolamine, 0.4 part of a silicone oil surfactant (siloxane-oxyalkylene copolymer), 38 parts trichloromonofluoromethane and 0.2 part dibutyltin dilaurate. The foamed product was cured for 10 minutes at 70° C.

*Example 4*

105 parts of a mixture comprising 65% by weight of a propylene oxide addition product of 1,1,3-tris(hydroxyphenyl)-propane (Hydroxyl No. 250) and 35% by weight of a propylene oxide addition product of glycerol (Hydroxyl No. 633) were blended with 35 parts of a propylene oxide addition product of diethylenetriamine (Hydroxyl No. 700), 34 parts trichloromonofluoromethane, 0.4 part of a silicone oil surfactant (siloxane-oxyalkylene copolymer), 0.2 part dibutyltin dilaurate and 111.5 parts tolylene diisocyanate. The foamed product was cured for 10 minutes at 70° C.

*Example 5*

75 parts of a propylene oxide addition product of sorbitol (Hydroxyl No. 455) and 25 parts of a propylene oxide addition product of diethylenetriamine (Hydroxyl No. 700) were blended with 24.3 parts trichloromonofluoromethane, 0.28 part of a silicone oil surfactant (siloxane-oxyalkylene copolymer), 0.14 part dibutyltin dilaurate and 95.7 parts of tolylene diisocyanate. The foamed product was cured for 10 minutes at 70° C.

*Example 6*

75 parts of a mixture comprising 65% by weight of a propylene oxide addition product of 1,1,3-tris(hydroxyphenyl)-propane and 35% by weight of a propylene oxide addition product of glycerol (Hydroxyl No. 633) were blended with 25 parts of a propylene oxide addition product of ethylenediamine (Hydroxyl No. 768), 22.9 parts trichloromonofluoromethane, 0.28 part of a silicone oil surfactant (siloxane-oxyalkylene copolymer), 0.14 part dibutyltin dilaurate and 85.5 parts tolylene diisocyanate. The foamed product was cured for 10 minutes at 70° C.

*Example 7*

75 parts of a propylene oxide addition product of 1,1,3-tris(hydroxyphenyl)propane and 25 parts of a propylene oxide addition product of diethylenetriamine were blended with 24.3 parts trichloromonofluoromethane, 0.28 part of a silicone oil surfactant (siloxane-oxyalkylene copolymer), 0.14 part dibutyltin dilaurate and 63 parts tolylene diisocyanate. The foamed product was cured for 10 minutes at 70° C.

*Example 8*

75 parts of a propylene oxide addition product of methyl glucoside (Hydroxyl No. 433) and 25 parts of a propylene oxide addition product of diethylenetriamine (Hydroxyl No. 700) were blended with 24.3 parts trichloromonofluoromethane, 0.28 part of a silicone oil surfactant (siloxane-oxyalkylene copolymer), 0.14 part dibutyltin dilaurate and 86.5 parts tolylene diisocyanate. The foamed product was cured for 10 minutes at 70° C.

The polyurethane foams prepared in Examples 1 to 8 were blended with phenothiazine prior to foaming and examined visually for scorch by removing a sample ¼" thick from the center of the foam and looking at it through a strong light. Scorching was characterized as either severe, mild, medium or none. The data tabulated in Table I below illustrate the effectiveness of phenothiazine as a stabilizer against scorch for urethane foams prepared from polyether-isocyanate systems which contain a tertiary amine.

TABLE I

| Example | Phenothiazine, Weight Percent | Amount of Scorch |
|---------|-------------------------------|------------------|
| 1 |        | Very mild. |
| 1 | 0.04   | None. |
| 2 |        | Very mild. |
| 2 | 0.04   | None. |
| 3 |        | Very mild. |
| 3 | 0.04   | None. |
| 4 |        | Severe. |
| 4 | 0.04   | Mild. |
| 5 |        | Severe. |
| 5 | 0.05   | Medium. |
| 6 |        | Severe. |
| 6 | 0.05   | Mild. |
| 7 |        | Very mild. |
| 7 | 0.05   | None. |
| 8 |        | Severe. |
| 8 | 0.05   | Mild. |

*Example 9*

Polyurethane foams were produced by the one shot method from the following formulation:

| | Parts by weight |
|---|---|
| Polyether polyol [1] | 100 |
| Emulsifier [2] | 2.0 |
| Water | 5.2 |
| N,N,N',N'-tetramethyl-1,3-butanediamine | 0.1 |
| Stannous octoate | 0.4 |
| Ferric chloride | 0.0025 |

Tolylene diisocyanate, 14 percent excess.

[1] Propylene oxide adduct of glycerol having a hydroxyl number of 56.
[2] Siloxane-oxyalkylene copolymer of the formula:

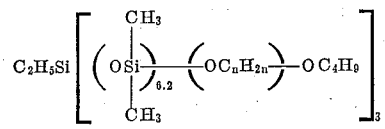

wherein the ($OC_nH_{2n}$) moiety represents a polyoxyalkylene group having an average of 18 oxyethylene groups and 14 oxypropylene groups.

In the above-described formulation, the ferric chloride was added to catalyze the free radical reactions that cause scorch. It was found that when 0.0025 part by weight of phenothiazine was added to this formulation, the scorch was very slight. When the phenothiazine was left out of the formulation, the scorch was medium to bad.

What is claimed is:
1. A method for the production of polyurethane foams which comprises reacting a polyether polyol with an organic polyisocyanate in the presence of a tertiary amine, a blowing agent selected from the group consisting of water, vaporizable halocarbons, and mixtures thereof, and a stabilizing amount of phenothiazine.
2. A method for the production of polyurethane foams which comprises reacting a polyether polyol with an organic polyisocyanate in the presence of a tertiary amine, a vaporizable halocarbon, and a stabilizing amount of phenothiazine.
3. A method for the production of polyurethane forms which comprises reacting a polyether polyol with an organic polyisocyanate in the presence of a tertiary amine, an organic tin compound, a vaporizable halocarbon, and a stabilizing amount of phenothiazine.
4. A method for the production of polyurethane foams which comprises reacting a polyether polyol with an organic polyisocyanate in the presence of a tertiary amine, an organic tin compound, a vaporizable fluorocarbon, and a stabilizing amount of phenothiazine.
5. The method of claim 1 wherein the polyether polyol is a polyoxypropylene polyol.
6. The method of claim 1 wherein the organic polyisocyanate is an aromatic polyisocyanate.
7. The method of claim 4 wherein the fluorocarbon is trichloromonofluoromethane.

References Cited by the Examiner

UNITED STATES PATENTS 2,929,804  3/60  Steuber _____ 260—45.8 XR
2,948,691  8/60  Windemuth et al. _____ 260—2.5
3,075,927  1/63  Lanham _____ 260—2.5

LEON J. BERCOVITZ, *Primary Examiner.*

DONALD E. CZAJA, *Examiner.*